(12) United States Patent
Oz et al.

(10) Patent No.: US 9,808,998 B2
(45) Date of Patent: Nov. 7, 2017

(54) COMPOSITE MATERIAL AND PRODUCTION METHOD THEREOF

(71) Applicant: KORDSA GLOBAL ENDUSTRIYEL IPLIK VE KORD BEZI SANAYI VE TICARET ANONIM SIRKETI, Kocaeli (TR)

(72) Inventors: Saim Oz, Kocaeli (TR); Elif Erdogan, Kocaeli (TR); M. Huseyin Ates, Kocaeli (TR)

(73) Assignee: KORDSA GLOBAL ENDUSTRIYEL IPLIK VE KORD BEZI SANAYI VE TICARET ANONIM SIRKETI, Kocaeli (TR)

( * ) Notice: Subject to any disclaimer, the term of this patent is extended or adjusted under 35 U.S.C. 154(b) by 667 days.

(21) Appl. No.: 14/359,788

(22) PCT Filed: Nov. 22, 2012

(86) PCT No.: PCT/IB2012/056612
§ 371 (c)(1),
(2) Date: May 21, 2014

(87) PCT Pub. No.: WO2013/076671
PCT Pub. Date: May 30, 2013

(65) Prior Publication Data
US 2014/0349103 A1   Nov. 27, 2014

(30) Foreign Application Priority Data
Nov. 22, 2011  (TR) .............................. a 2011 11536

(51) Int. Cl.
*B29C 70/54*  (2006.01)
*B29C 70/56*  (2006.01)
(Continued)

(52) U.S. Cl.
CPC ............ *B29C 70/545* (2013.01); *B29C 70/56* (2013.01); *B32B 5/02* (2013.01); *B29C 70/46* (2013.01);
(Continued)

(58) Field of Classification Search
CPC ....... B29C 70/46; B29C 70/56; B29C 70/545; B32B 5/02; B32B 2262/0261;
(Continued)

(56) References Cited

U.S. PATENT DOCUMENTS 6,190,484 B1  2/2001  Appa
6,277,463 B1  8/2001  Hamilton et al.

FOREIGN PATENT DOCUMENTS

| EP | 0123225 A1 * | 10/1984 | ............ B29C 70/16 |
| EP | 0123225 A1 | 10/1984 | |
| GB | 1464631 A | 2/1977 | |

OTHER PUBLICATIONS

International Search Report for International Application No. PCT/IB2012/056612, mailed May 15, 2013 (4 pages).
(Continued)

*Primary Examiner* — Vishal I Patel
(74) *Attorney, Agent, or Firm* — Clark & Elbing LLP; Susan M. Michaud

(57) ABSTRACT

The present invention relates to production method of a composite material wherein the composite material is tensioned and cured to produce a composite material with a single cord or cord fabric reinforced with another component, comprising the steps of adhering at least two layers of compound material, attaching the adhered compound materials inside a hollow frame, placing said frame into a pre-tensioning device, wrapping the cords around the frame with the desired pre-tension, removing the frame together with the compound material and the cords from the pre-
(Continued)

tensioning device, placing at least one layer of compound material on the curing tray, placing the coated frame removed from the pre-tensioning device onto the compound material layers, placing at least one more layer of compound material on the coated frame, closing the lid over the curing tray, curing the material and cutting the composite material into strips.

12 Claims, 1 Drawing Sheet

(51) Int. Cl.
    *B32B 5/02*     (2006.01)
    *B29C 70/46*     (2006.01)
    *B29K 201/00*     (2006.01)
    *B29K 267/00*     (2006.01)
    *B29K 277/00*     (2006.01)
    *B29K 305/00*     (2006.01)
    *B29L 9/00*     (2006.01)
    *B29L 30/00*     (2006.01)
    *B29L 31/00*     (2006.01)

(52) U.S. Cl.
    CPC ...... *B29K 2201/00* (2013.01); *B29K 2267/00* (2013.01); *B29K 2277/00* (2013.01); *B29K 2305/00* (2013.01); *B29L 2009/005* (2013.01); *B29L 2030/00* (2013.01); *B29L 2031/757* (2013.01); *B32B 2262/0261* (2013.01); *Y10T 428/249921* (2015.04)

(58) Field of Classification Search
    CPC ........... B29L 2031/757; B29L 2030/00; B29L 2009/005; Y10T 428/249921; B29K 2277/00; B29K 2267/00; B29K 2201/00; B29K 2305/00
    See application file for complete search history.

(56) References Cited

OTHER PUBLICATIONS

Search Report for Turkish Application No. 2011/11536, mailed Nov. 20, 2012 (7 pages).

\* cited by examiner

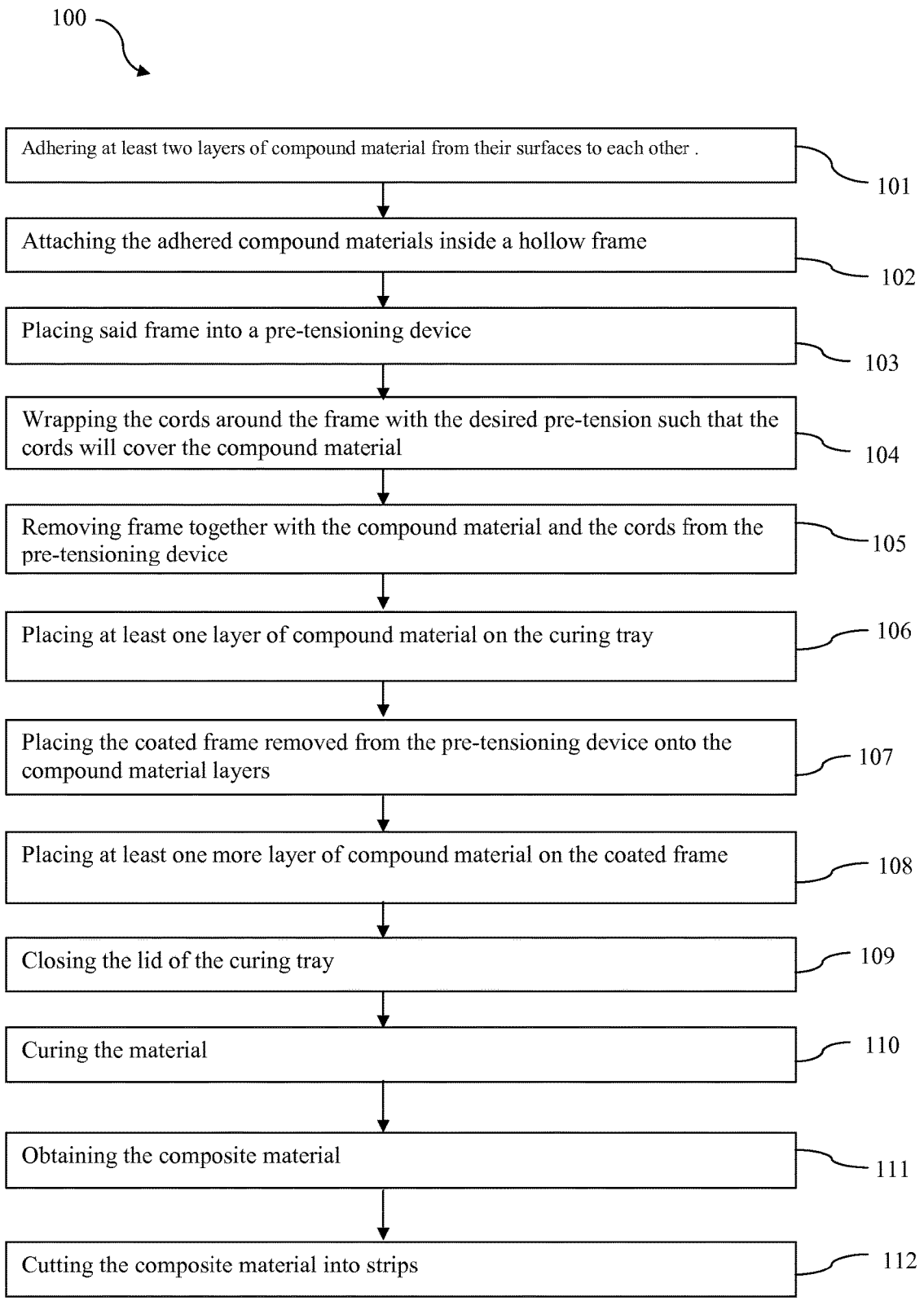

COMPOSITE MATERIAL AND PRODUCTION METHOD THEREOF

CROSS-REFERENCE TO RELATED APPLICATIONS

This application is the U.S. National Stage of PCT/IB2012/056612, filed Nov. 22, 2012, which claims benefit of Turkish Application No. 2011/11536, filed Nov. 22, 2011.

TECHNICAL FIELD

The present invention relates to a composite material and production method thereof, wherein a single cord or cord fabric is tensioned and cured in order to produce a composite material reinforced with another component.

BACKGROUND OF THE INVENTION

Today, the cord wrapping moulds used are comprised of gears that are placed in certain intervals on the short sides of a rectangular hollow plate. The operator ties a knot on the cord sample before the first gear and places the sample to the first gear during the wrapping of the cord sample to be tested and ensures that the starting point remains fixed. During wrapping, the cord samples are subjected to humidity, light and in addition contact with hand for a long time. With the completion of the wrapping procedure, cords wrapped on a single surface are obtained.

The compounds to be used during testing are placed on the front surface of the frame wrapped with cords and a gentle force is applied which aims to provide the green tackiness. Following this, the cords are cut off by the short sides of the rectangular frame. As this cutting process is not provided under control, this causes that the pre-tensioning is completely lost. Same wrapping process and compound placing process in order to enable green tackiness on the wrapped cords is repeated one more time. A layer of compound is added on each inner surfaces (on the other surfaces of the cords which are cut from the frame sides and on which single layer of compound is placed) of these samples which have uncontrolled pre-tension. The samples comprised of the compounds and cords obtained are adhered to each other symmetrically. After the other layers present in the standard procedure are added on the bottom and the top of four layers of compound and two layers of cord sandwich obtained, the composite material which takes its final form is placed into the press in order to be cured. As a result, during curing under the press the sample is subjected to pressure applied and to heat. While the compound forms a liquid medium with high viscosity under pressure and heat; the single cords create deviation in their direction since they find space to move. The strengths of the samples placed in the shoe shine flex fatigue by being formed in strips after the curing procedure show variations compared with their strengths after fatigue. The cords not carrying the fatigue load in the same direction, the humidity, light and contact with hand factors are among some of the reasons.

Another single cord apparatus used today is the drum unit. The drum unit provides superiority against the cord wrapping apparatus in terms of providing a certain amount of pre-tension to the sample. The system responds to certain tension adjustments via a motorized system to which the sample roller is connected. However, the pre-tension preservation is provided by an apparatus system passing on the end parts of the cords wrapped on the compound by applying pressure. Applying pressure from the compound point via the end part of the cord and cutting the cords from their end parts take place at the same time. Similar to the first method, the "first adhesion (green tackiness)" method is preferred for adhering the part of the cords before cutting to the compound surface. However, since the green tackiness is only present at the end parts and the sample is prepared on a cylinder from the beginning to the end, certain orientations take place in the cords and pre-tension loss is seen with this during placing the sample to be cured into a flat container.

English patent document no GB1464631, one of the applications known in the state of the art, discloses a system wherein the fabrics are coated with synthetic materials. Procedures such as unwinding threads, applying coating material on the thread, heating threads in baking oven, hot rolling in a calendar, and winding-up on reel are carried out in the system. The fabric is stretched on a tenter during the whole baking period and the coating process is carried out while the fabric is still hot.

SUMMARY OF THE INVENTION

The objective of the present invention is to provide a composite material and a production method thereof wherein the single cord or cord fabric is subjected to tensioning before curing.

Another objective of the present invention is to provide a composite material formed by treating with heat single cord or cord fabric with reinforcement components and a production method thereof.

A further objective of the present invention is to provide a composite material and production method thereof wherein each one of the single cord or cord fabric samples shows uniform breaking strength values with very low standard variation as a result of the performance tests.

Yet another objective of the present invention is to provide a composite material and a production method thereof wherein the pre-tensioning control is carried out via software.

Another objective of the present invention is to provide a composite material and production method thereof wherein the time spent until the single cord or cord fabric is cured with the reinforcement components is shortened.

DETAILED DESCRIPTION OF THE INVENTION

A pre-tensioned curing mould developed in order to fulfil the objectives of the present invention is illustrated in the accompanying FIGURE wherein FIG. 1—is a flowchart of a composite material production method.

"A composite material production method" (100) developed to fulfil the objectives of the present invention comprises the steps of adhering at least two layers of compound material from their surfaces to each other (101), attaching the adhered compound materials inside a hollow frame (102), placing the frame into the pre-tensioning device (103), wrapping the cords around the frame with the desired pre-tension such that the cords will cover the compound material (104), removing the frame together with the compound material and the cords from the pre-tensioning device (105), placing at least one layer of compound material on the curing tray (106), placing the coated frame removed from the pre-tensioning device onto the compound material layers (107),
placing at least one more layer of compound material on the coated frame (108),
closing the lid of the curing tray (109),
curing the material (110),
obtaining the composite material (111),
cutting the composite material into strips (112).

In the inventive composite material production method (100); at least two layers of compound materials are adhered to each other from one surface (101). In the preferred embodiment of the present invention, cellophane bands positioned back to back are used in order to separate adhered layers from each other later and the cellophane band is applied in strips to at least one side of the compound materials. The sticky parts of the cellophane bands are firstly adhered onto the compounds; following this, the compounds are placed on top of each other such that their slippery parts will be back to back. The compounds are adhered to each other independent from the cellophane band. The aim in placing said cellophane bands is to ensure that the 2 cm of the end parts do not stick to each other. Following the fatigue test the strip sample is separated into two. In order to measure the adhering force during the separation, the sample is attached to dynamometer claws. For this attachment process one end of the strip sample must be separated into two pieces; in other words it should not stick to each other during curing. In the preferred embodiment of the present invention, the compound materials are rectangular; and the cellophane bands in strips are adhered to the short sides of said compound materials. In another embodiment of the present invention, the sizes of the compound materials are 22×25 cm, whereas the sizes of the cellophane bands are 22×2 cm.

Said compound materials adhered to each other are attached from at least two sides inside a frame resistant to high temperatures (102). In the preferred embodiment of the invention the frame is rectangular, the compound materials are attached to the frame from the short sides. In the preferred embodiment of the invention the frame is made of metallic material.

Then, the frame in which the compound material is attached is placed into the slides present in the pre-tensioning device by being pressed (103).

Single cords or cord fabric are wrapped around the frame placed inside the pre-tensioning device with a certain pre-tension force such that they surround the compound material (104). In the preferred embodiment of the invention the pre-tensioned wrapping procedure (104) is carried out via computer software in preferred sequence and tension. In the preferred embodiment of the invention, the cords are manufactured from nylon 6.6 or polyester material. In the preferred embodiment of the invention, the surfaces of the cords are coated with an RFL (Resorcinol Formaldehyde Latex) mixture that enables chemical bonding with the compound material.

The frame, in which the compound material is attached and around which the single cords or cord fabrics are wrapped, is taken out of the pre-tensioning device (105) following the completion of the pre-tension wrapping procedure (104).

In another part, at least one layer of compound material is placed on top of a curing tray, compatible to the dimensions of the compound material (106). In the preferred embodiment of the invention, three layers of compound material are placed on the tray. In the preferred embodiment of the invention, the curing tray is manufactured from metal material resistant to high temperatures. In the embodiment of the invention, the curing tray is planar and there is a large recess in the middle of the tray in which materials are placed.

The frame which is taken out of the pre-tensioning device, which has at least two layers of compound material therein and around which single cord or cord fabric is wrapped, is added onto the compound materials layers present on the curing tray (107).

Then, at least one layer of compound material is placed on all the said material (108). In the preferred embodiment of the invention, three layers of compound material are placed on the coated frame.

In the preferred embodiment of the invention, a total of eight layers of compound material and two layers of single cord or cord fabric layer between them are present on the tray.

After the materials are placed on the curing tray, its lid is closed (109) and the tray is placed inside the curing press and the materials are cured therein (110). During the curing process, covalent bonds and sulphur bonds are established between the compound material and the single cords or cord fabrics (110). Therefore, a strong composite material which has cross links is obtained. (111)

Finally, the composite material that has been obtained is cut into strips and becomes ready to be used (112). In an embodiment of the invention, the sizes of the strips are 2.5×25 cm.

Then, a fatigue test is performed on composite strip samples and the strips are separated from the middle by means of the cellophane bands that are stuck previously so that adhesive force of the strips is measured. This measurement is carried out by attaching the strip samples into the dynamometer claws.

The said composite material used in producing tire gives stability to the tire. In order to be able to observe the same behaviour during the performance tests of the cord fabric samples and to eliminate test variation, the sample needs to be wrapped under a controlled pre-tension and the sample that has been prepared must be cured with the same pre-tension.

Within the scope of these basic concepts, it is possible to develop various embodiments of the inventive "composite material and a production method thereof". The invention can not be limited to the examples described herein and it is essentially as defined in the claims.

The invention claimed is:

1. A composite material production method (100), characterized by the sequential steps of:
    adhering at least two layers of compound materials to one another, each one on top another (101),
    attaching the adhered compound materials inside a hollow frame (102),
    placing said frame into a pre-tensioning device (103),
    wrapping cords around the frame with a desired pre-tension such that the cords will cover the compound material to form a coated frame (104),
    removing the coated frame (105),
    placing at least one layer of compound material on a curing tray comprising a lid (106),
    placing the coated frame removed from the pre-tensioning device onto the at least one layer of compound material (107),
    placing at least one more layer of compound material on the coated frame (108), closing the lid of the curing tray (109),
curing the compound material (110),
obtaining the composite material (111), and
cutting the composite material into strips (112).

2. A composite material production method (100), according to claim 1, characterized in that in the step of adhering at least two layers of compound materials from their surfaces to each other (101) cellophane band strips placed back to back are used in order to separate the adhered layers from each other later on and the said cellophane bands are applied to at least one side of the compound material in strips.

3. A composite material production method (100), according to claim 2, characterized in that the cellophane band strips comprise sticky parts and in the step of adhering at least two compound materials from their surfaces to each other (101), the sticky parts of the cellophane band strips are adhered onto the compounds and the compounds are adhered to each other such that their slippery parts are positioned back to back.

4. A composite material production method (100), according to claim 3, characterized in that the compound materials comprise short sides and in the step of adhering at least two compound materials from their surfaces to each other (101), the cellophane band strips are adhered onto the short sides of the compound materials, and wherein said compound materials are rectangular.

5. A composite material production method (100), according to claim 1 characterized in that in the step of attaching the adhered compound materials inside a hollow frame (102) the compound materials are attached from at least two sides inside a frame resistant to high temperatures.

6. A composite material production method (100), according to claim 5, characterized in that in the step of attaching the adhered compound materials inside a hollow frame (102) the compound material is attached to the frame from its short sides, wherein said frame is rectangular.

7. A composite material production method (100), according to claim 1 characterized in that the frame used in the step of attaching the adhered compound materials inside a hollow frame (102) is made of metallic material.

8. A composite material production method (100), according to claim 1 characterized in that in the step of wrapping the cords around the frame with the desired pre-tension such that the cords will cover the compound material (104), the wrapping procedure is carried out via a software program at preferred sequence and tension.

9. A composite material production method (100), according to claim 1 characterized in that in the step of wrapping the cords around the frame with the desired pre-tension such that the cords will cover the compound material (104), the cords are produced from nylon 6.6 or polyester material.

10. A composite material production method (100), according to claim 1 characterized in that the cords have surfaces and in the step of wrapping the cords around the frame with the desired pre-tension such that the cords will cover the compound material (104), the surfaces of the cords are coated with an RFL (Resorcinol Formaldehyde Latex) mixture that enables chemical bonding with the compound material.

11. A composite material production method (100), according to claim 1 characterized in that in the step of placing at least one layer of compound material on the curing tray (106), the curing tray used is produced from metal material resistant to high heat temperatures.

12. A composite material production method (100), according to claim 1, characterized in that covalent bonds and sulphur bonds are formed between the compound material and the cords in the step of curing the material (110).

* * * * *